United States Patent
Wang et al.

(10) Patent No.: US 11,897,012 B2
(45) Date of Patent: Feb. 13, 2024

(54) ORGANIC SOLID WASTE TREATMENT DEVICE BASED ON CHEMICAL-LOOPING HYDROGEN PRODUCTION

(71) Applicant: Huazhong University of Science and Technology, Wuhan (CN)

(72) Inventors: Xun Wang, Wuhan (CN); Tingting Xu, Wuhan (CN); Bo Xiao, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 18/042,640

(22) PCT Filed: Apr. 25, 2021

(86) PCT No.: PCT/CN2021/089538
§ 371 (c)(1),
(2) Date: Feb. 23, 2023

(87) PCT Pub. No.: WO2022/141976
PCT Pub. Date: Jul. 7, 2022

(65) Prior Publication Data
US 2023/0321701 A1  Oct. 12, 2023

(30) Foreign Application Priority Data
Dec. 31, 2020 (CN) .......................... 202011629938.1

(51) Int. Cl.
*B09B 3/45* (2022.01)
*B09B 3/70* (2022.01)

(52) U.S. Cl.
CPC . *B09B 3/45* (2022.01); *B09B 3/70* (2022.01)

(58) Field of Classification Search
CPC ................................... B09B 3/45; B09B 3/70
USPC ........................................................ 423/644
See application file for complete search history.

(56) References Cited

FOREIGN PATENT DOCUMENTS

| | | |
|---|---|---|
| CN | 102865669 A | 1/2013 |
| CN | 104129754 A | 11/2014 |
| CN | 104591087 A | 5/2015 |
| CN | 106190195 A | 12/2016 |
| CN | 107804824 A | 3/2018 |
| CN | 108868906 A | 11/2018 |
| CN | 110980644 A | 4/2020 |
| CN | 112624039 A | 4/2021 |
| WO | WO2020163256 A2 | 8/2020 |

*Primary Examiner* — Edward M Johnson
(74) *Attorney, Agent, or Firm* — Nitin Kaushik

(57) ABSTRACT

The present invention belongs to the field of energy and environmental protection and particularly relates to an organic solid waste treatment device based on chemical-looping hydrogen production and a method for using the same. The device comprises a pyrolysis reactor and a sleeve-type chemical-looping reactor, the sleeve-type chemical-looping reactor comprises an inner cavity, an outer cavity annularly wrapping the inner cavity, a syngas output device, a hydrogen output device, a pyrolysis gas inlet device, and a water vapor inlet device, and the pyrolysis reactor can generate pyrolysis gas, which then is conveyed to the sleeve-type chemical-looping reactor through the pyrolysis gas inlet device.

8 Claims, 1 Drawing Sheet

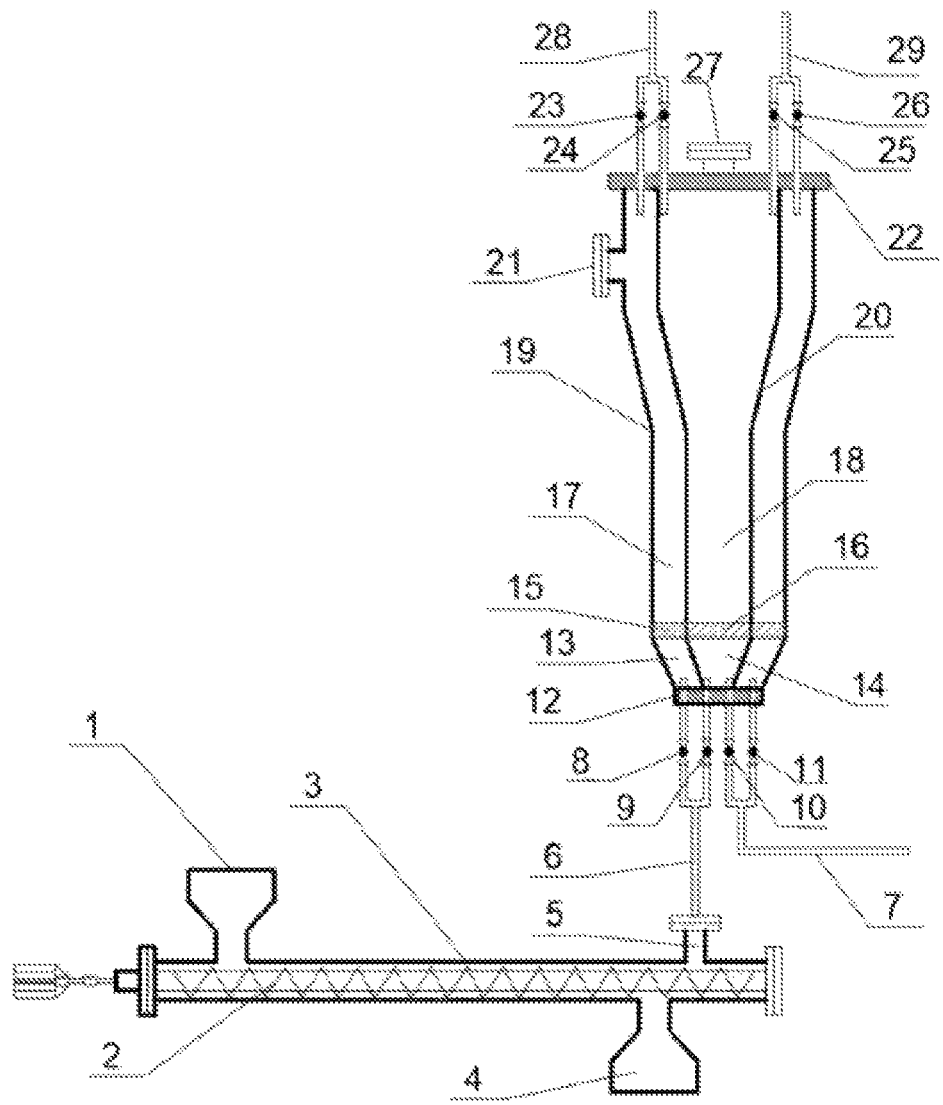

ORGANIC SOLID WASTE TREATMENT DEVICE BASED ON CHEMICAL-LOOPING HYDROGEN PRODUCTION

CROSS-REFERENCE TO RELATED APPLICATIONS

The application claims priority to Chinese patent application No. 2020116299381, filed on Dec. 31, 2020, the entire contents of which are incorporated herein by reference.

TECHNICAL FIELD

The present invention belongs to the field of energy and environmental protection and particularly relates to an organic solid waste treatment device based on chemical-looping hydrogen production and a method for using the same.

BACKGROUND

Hydrogen is an ideal clean energy source with high energy density, and the development of a hydrogen energy economy may reduce the emission of greenhouse gases and fine particles. In various countries and regions around the world, hydrogen energy is regarded as a strategic development direction of new energy in the future, and a hydrogen energy low-carbon society is constructed actively. As the largest hydrogen production country in the world, China is a global leader in industrial hydrogen production, with hydrogen production through coal gasification being one of the main hydrogen production technologies in China. However, the technology behind hydrogen production through coal gasification has some disadvantages, such as complex equipment structure, relatively low operation cycle, high desulfurization investment, more supporting devices, serious carbon emissions, high hydrogen production cost, and so on. Therefore, it is of great significance to develop a new technology for hydrogen production in China.

In recent years, researchers have developed a series of hydrogen production technologies, such as chemical-looping reforming and chemical-looping hydrogen production technologies, based on the principle of chemical-looping combustion technology. According to the chemical-looping reforming technology, lattice oxygen in an oxygen carrier ($Me_xO_y$) is utilized to partially oxidize fuel, and a ratio of $H_2$ and CO is regulated by controlling the ratio of oxygen carrier to fuel. Syngas is the target product of chemical-looping reforming but still requires further conversion and separation to obtain high concentrations of hydrogen. However, in the chemical-looping hydrogen production technology, during complete combustion, lattice oxygen combines with fuel to produce $CO_2$ and $H_2O$, the reduced oxygen carrier reacts with water in the water vapor reactor to produce $H_2$, and finally, the high-purity hydrogen can be prepared by condensation, and $CO_2$ can also be captured.

CN104194834A discloses a device for biomass pyrolysis and hydrogen production using a biomass pyrolysis gas, and the device mainly comprises a biomass pyrolysis gasification device and a chemical-looping hydrogen production reaction apparatus, wherein the chemical-looping hydrogen production reaction device is provided with a plurality of sections with different cross-sectional diameters for adjusting the gas flow rate to control the rate and completeness of the reaction. A biomass pyrolysis gasification device, which generates biomass pyrolysis gas through biomass pyrolysis, is in communication with a chemical-looping hydrogen production reaction device, which generates hydrogen by using the biomass pyrolysis gas generated in the biomass pyrolysis gasification device and water vapor to alternately undergo a redox reaction with an oxygen carrier, through a pyrolysis gas conveying pipe; the chemical-looping hydrogen production reaction device comprises a first section, a second section, and a third section, the second section being disposed between the first section and the third section, the first section and the third section each having a larger cross-sectional diameter than the second section; the first section is a pyrolysis gas distribution section and is provided with a reaction gas inlet, and the biomass pyrolysis gasification device is in communication with the reaction gas inlet through a pyrolysis gas conveying pipe; the second section is a redox reaction occurrence section, and an oxygen carrier is provided in the second section; the third section is a gas flow buffer section and is provided with a gas outlet. The chemical-looping hydrogen production reaction device in this technical scheme mainly utilizes the $NiFe_2O_4$ oxygen carrier with a spinel structure to alternately react with biomass pyrolysis gas and water vapor and has the defects of the cumbersome device, the low utilization rate of the oxygen carrier and incapability of preparing syngas while producing hydrogen so that there is room for improvement.

The combination of chemical-looping reforming and chemical-looping hydrogen production technology can realize the co-production of high-concentration hydrogen and syngas in one process, i.e., a process for chemical-looping co-production of hydrogen and syngas, which greatly improves the energy utilization efficiency and can obtain relatively pure syngas and high concentration hydrogen with great development potential. The process is not only beneficial to developing a novel hydrogen production process and relieving the fossil energy crisis but also can provide ideas for the resource utilization of organic solid wastes in China.

SUMMARY

In response to the need for improvement in the prior art, the present invention provides an organic solid waste treatment device based on chemical-looping hydrogen production. By designing the chemical-looping reforming coupling hydrogen production coupling continuous reaction device, chemical-looping reforming and chemical-looping hydrogen production technologies can be realized in one process, syngas, and co-production of high-concentration hydrogen can be realized without a complicated gas separation and purification system for hydrogen, thus having broad application prospects. The detailed technical solution of the present invention is as follows.

In order to achieve the above object, one aspect of the present invention comprises a pyrolysis reactor and a sleeve-type chemical-looping reactor, wherein the sleeve-type chemical-looping reactor comprises an inner cavity and an outer cavity annularly wrapping the inner cavity, the pyrolysis reactor can generate pyrolysis gas, which then is input to the inner cavity and the outer cavity through the pyrolysis gas inlet device, water vapor is input to the inner cavity and the outer cavity through a water vapor inlet device, the syngas generated in the inner cavity and the outer cavity is output through a syngas output device, the hydrogen generated in the inner cavity and the outer cavity is output through a hydrogen output device, an outer reaction chamber is internally loaded with an outer chamber oxygen carrier, an inner reaction chamber is loaded with an inner chamber oxygen carrier, and the outer chamber oxygen carrier and the inner chamber oxygen carrier can be converted into each other through a reversible chemical reaction.

Preferably, the outer chamber oxygen carrier is a reduced oxygen carrier, which is oxidized into an oxidized oxygen carrier by the water vapor;
alternatively, the outer chamber oxygen carrier is an oxidized oxygen carrier, which is reduced into a reduced oxygen carrier by the pyrolysis gas;
preferably, the inner cavity is horizontally partitioned by an inner cavity partition plate to form an inner gas distribution chamber and an inner reaction chamber, and the outer cavity is horizontally partitioned by an outer cavity partition plate to form an outer gas distribution chamber and an outer reaction chamber;
the syngas output device is a three-way pipe, comprising a first syngas outlet branch pipe in communication with the outer reaction chamber, a second syngas outlet branch pipe in communication with the inner reaction chamber, and a syngas output pipe;
the hydrogen output device is a three-way pipe, comprising a first hydrogen outlet branch pipe in communication with the outer reaction chamber, a second hydrogen outlet branch pipe in communication with the inner reaction chamber, and a hydrogen output pipe;
the pyrolysis gas inlet device is a three-way pipe, comprising a first pyrolysis gas inlet branch pipe in communication with the outer gas distribution chamber, a second pyrolysis gas inlet branch pipe in communication with the inner gas distribution chamber, and a pyrolysis gas inlet pipe;
the water vapor inlet device is a three-way pipe, comprising a first water vapor inlet branch pipe in communication with the outer gas distribution chamber, a second water vapor inlet branch pipe in communication with the inner gas distribution chamber, and a water vapor inlet pipe;
the first pyrolysis gas inlet branch pipe, the second pyrolysis gas inlet branch pipe, the second water vapor inlet branch pipe, the first water vapor inlet branch pipe, the first syngas outlet branch pipe, the second syngas outlet branch pipe, the second hydrogen outlet branch pipe, and the first hydrogen outlet branch pipe are all provided with valves.

Preferably, the outer chamber oxygen carrier is a reduced oxygen carrier, which is oxidized into an oxidized oxygen carrier by the water vapor.

Preferably, the outer chamber oxygen carrier is an oxidized oxygen carrier, which is reduced into a reduced oxygen carrier by the pyrolysis gas;
preferably, an active ingredient of the oxidized oxygen carrier comprises one of ferroferric oxide ($Fe_3O_4$) and brownmillerite ($Ca_2Fe_2O_5$), preferably the oxidized oxygen carrier is further compounded with an active component and an inert component, which are one or more of $Al_2O_3$, $ZrO_2$, NiO, and $CeO_2$, and the oxidized oxygen carrier has a particle size of 100-300 μm.

When the oxidized oxygen carrier is $Fe_3O_4$, the reaction proceeds as follows.

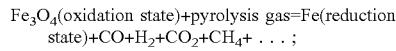

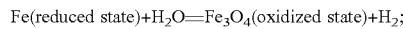

When the oxidized oxygen carrier is $Ca_2Fe_2O_5$, the reaction proceeds as follows.

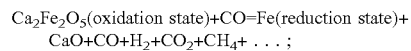

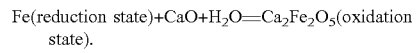

By "..." is meant that very little carbon-containing gas is also present.

The addition of an active component or an inert component may improve the performance of the oxygen carrier, and increase the activity and catalytic performance of the iron-based oxygen carrier, thus obtaining more syngas and hydrogen.

Preferably, a cross-sectional area of the inner reaction chamber to that of the outer reaction chamber has a ratio of 1:1, the outer cavity partition plate is an annular porous partition plate, the inner cavity partition plate is a circular porous partition plate, the annular porous partition plate, and the circular porous partition plate have diameters of the pores of 50-100 μm, with a total area of the pores accounting for 50-70% of the surface area.

Preferably, the pyrolysis reactor is successively provided with a feed hopper, a feed auger, and a pyrolysis carbon collection hopper along the feeding direction of the organic solid waste, and the pyrolysis reactor is in communication with the pyrolysis gas inlet pipe through a pyrolysis gas output channel.

Preferably, the pyrolysis reactor has a pyrolysis temperature of 500-700° C., the sleeve-type chemical-looping reactor has a reaction temperature of 800-1000° C., and the inside of the pyrolysis reactor, the inner reaction chamber, and the outer reaction chamber are provided with heating means.

Preferably, the sleeve-type chemical-looping reactor is provided with a sealing bottom plate, the pyrolysis gas inlet device and the water vapor inlet device are fixed by inserting into the sealing bottom plate, the outer cavity and the outer cavity are partitioned by a partition plate, the inner reaction chamber is provided with a sealing top plate, the sealing top plate is provided with an inner reaction chamber feed and discharge channel, and the outer reaction chamber is provided with an outer reaction chamber feed and discharge channel.

In another aspect of the present invention, provided is a method for using an organic solid waste treatment device, which comprises the following steps:
(1) placing the organic solid waste in a feed hopper, conveying the organic solid waste from a feed auger to the inside, performing pyrolysis at a pyrolysis temperature to generate a pyrolysis gas and a pyrolysis carbon, the pyrolysis gas entering a pyrolysis gas inlet device through a pyrolysis gas channel, and conveying the pyrolysis carbon to a pyrolysis carbon collection hopper for storage;
(2) loading the outer reaction chamber with a reduced oxygen carrier, loading the inner reaction chamber with an oxidized oxygen carrier, opening the valves of the second pyrolysis gas inlet branch pipe and the first water vapor inlet branch pipe, closing the first pyrolysis gas inlet branch pipe and the second water vapor inlet branch pipe, introducing water vapor into the outer reaction chamber, introducing pyrolysis gas into the inner reaction chamber so that an oxidation reaction occurs in the outer reaction chamber at an operating temperature to generate hydrogen, and a reduction reaction occurs in the inner reaction chamber at an operating temperature to generate syngas;

(3) after the reaction is completed, opening the valves of the second syngas outlet branch pipe and the first hydrogen outlet branch pipe, closing the valves of the first syngas outlet branch pipe and the second hydrogen outlet branch pipe, outputting hydrogen through the hydrogen output device, and outputting syngas through the syngas output device;

(4) opening the first pyrolysis gas inlet branch pipe and the second water vapor inlet branch pipe, closing the valves of the second pyrolysis gas inlet branch pipe and the first water vapor inlet branch pipe, introducing pyrolysis gas into the outer reaction chamber, introducing water vapor into the inner reaction chamber so that a reduction reaction occurs in the outer reaction chamber at an operating temperature to generate syngas, and an oxidation reaction occurs in the inner reaction chamber at an operating temperature to generate hydrogen;

(5) after the reaction is completed, opening the valves of the first syngas outlet branch pipe and the second hydrogen outlet branch pipe, closing the valves of the second syngas outlet branch pipe and the first hydrogen outlet branch pipe, outputting hydrogen through the hydrogen output device, and outputting syngas through the syngas output device;

(6) repeating steps (2) to (5) to continuously produce syngas and hydrogen.

In another aspect of the present invention, provided is a method for using an organic solid waste treatment device, which comprises the following steps:

(1) placing the organic solid waste in a feed hopper, conveying the organic solid waste from a feed auger to the inside, performing pyrolysis at a pyrolysis temperature to generate a pyrolysis gas and a pyrolysis carbon, the pyrolysis gas entering a pyrolysis gas inlet device through a pyrolysis gas channel, and conveying the pyrolysis carbon to a pyrolysis carbon collection hopper for storage;

(2) loading the outer reaction chamber with an oxidized oxygen carrier, loading the inner reaction chamber with a reduced oxygen carrier, opening the first pyrolysis gas inlet branch pipe and the second water vapor inlet branch pipe, closing the valves of the second pyrolysis gas inlet branch pipe and the first water vapor inlet branch pipe, introducing pyrolysis gas into the outer reaction chamber, introducing water vapor into the inner reaction chamber so that a reduction reaction occurs in the outer reaction chamber at an operating temperature to generate syngas, and an oxidation reaction occurs in the inner reaction chamber at an operating temperature to generate hydrogen;

(3) after the reaction is completed, opening the valves of the first syngas outlet branch pipe and the second hydrogen outlet branch pipe, closing the valves of the second syngas outlet branch pipe and the first hydrogen outlet branch pipe, outputting hydrogen through the hydrogen output device, and outputting syngas through the syngas output device;

(4) opening the valves of the second pyrolysis gas inlet branch pipe and the first water vapor inlet branch pipe, closing the first pyrolysis gas inlet branch pipe and the second water vapor inlet branch pipe, introducing water vapor into the outer reaction chamber, introducing pyrolysis gas into the inner reaction chamber so that an oxidation reaction occurs in the outer reaction chamber at an operating temperature to generate hydrogen, and a reduction reaction occurs in the inner reaction chamber at an operating temperature to generate syngas;

(5) after the reaction is completed, opening the valves of the second syngas outlet branch pipe and the first hydrogen outlet branch pipe, closing the valves of the first syngas outlet branch pipe and the second hydrogen outlet branch pipe, outputting hydrogen through the hydrogen output device, and outputting syngas through the syngas output device;

(6) repeating steps (2) to (5) to continuously produce syngas and hydrogen.

In the present invention, when the hydrogen has a concentration of less than 1%, the reaction is judged to be completed, and the detection of the hydrogen concentration is performed by an online gas analyzer.

The present invention has the following beneficial effects:

(1) by designing the chemical-looping hydrogen production coupling continuous reaction device in the present invention, chemical-looping reforming and chemical-looping hydrogen production technologies can be realized in one process, compared with the conventional chemical-looping reforming and the chemical-looping hydrogen production technology, co-production of syngas and high-concentration hydrogen can be realized without a complicated gas separation and purification system for hydrogen, the cost is low, and the operation is simple;

(2) the oxygen carrier does not need to flow between reactors, which reduces the requirements for the wear resistance and strength of the oxygen carrier in the conventional technology, and reduces the energy consumption required for the circulation of the oxygen carrier at the same time; hydrogen and syngas can be prepared continuously by switching the pyrolysis gas and water vapor inlet valves; the heat generated by the oxygen carrier during the oxidation process can be transferred through the inner heat-resistant shell, which helps to save energy;

(3) the carbon produced by the pyrolysis reaction device can be used in the fields of improving the soil environment, repairing the heavy metal pollution in the soil, and preparing syngas by water vapor gasification, which has broad market prospects and environmental benefits after being widely applied.

BRIEF DESCRIPTION OF DRAWINGS

The FIGURE is a schematic structural diagram of the device in the present invention.

The same reference numbers will be used throughout the drawings to refer to the same or like elements or structures, wherein: a feed hopper 1, a feed auger 2, a pyrolysis reactor 3, a pyrolysis carbon collection hopper 4, a pyrolysis gas output channel 5, a pyrolysis gas inlet device 6, a water vapor inlet device 7, a first pyrolysis gas inlet branch pipe 8, a second pyrolysis gas inlet branch pipe 9, a second water vapor inlet branch pipe 10, a first water vapor inlet branch pipe 11, a sealing bottom plate 12, an outer gas distribution chamber 13, an inner gas distribution chamber 14, an outer cavity partition plate 15, an inner cavity partition plate 16, an outer reaction chamber 17, an inner reaction chamber 18, a sleeve-type chemical-looping reactor 19, a partition plate 20, an outer reaction chamber feed and discharge channel 21, and a sealing top plate 22; a first syngas outlet branch pipe 23, a second syngas outlet branch pipe 24, a second hydrogen outlet branch pipe 25, a first hydrogen outlet branch pipe 26, an inner reaction chamber feed and discharge channel 27, a syngas output device 28, and a hydrogen output device 29.

DETAILED DESCRIPTION OF THE EMBODIMENTS

To make the objectives, technical solutions, and advantages of the present invention clearer, the following further describes the present invention in detail regarding the accompanying drawings and examples. It should be understood that the specific examples described herein are merely illustrative of the present invention and are not intended to limit the present invention. Further, the technical features involved in the various examples of the present invention described below may be combined as long as they do not constitute a conflict with each other.

Example 1

An organic solid waste treatment device based on chemical-looping hydrogen production, as shown in the FIGURE, comprises a pyrolysis reactor 3 and a sleeve-type chemical-looping reactor 19, the sleeve-type chemical-looping reactor 19 comprises an inner cavity, an outer cavity annularly wrapping the inner cavity, a syngas output device 28, a hydrogen output device 29, a pyrolysis gas inlet device 6, and a water vapor inlet device 7, and the pyrolysis reactor 3 can generate pyrolysis gas, which then is conveyed to the sleeve-type chemical-looping reactor 19 through the pyrolysis gas inlet device 6; the inner cavity is horizontally partitioned by an inner cavity partition plate 16 to form an inner gas distribution chamber 14 and an inner reaction chamber 18, and the outer cavity is horizontally partitioned by an outer cavity partition plate 15 to form an outer gas distribution chamber 13 and an outer reaction chamber 17; the syngas output device 28 is a three-way pipe, comprising a first syngas outlet branch pipe 23 in communication with the outer reaction chamber 17, a second syngas outlet branch pipe 24 in communication with the inner reaction chamber 18, and a syngas output pipe; the hydrogen output device 29 is a three-way pipe, comprising a first hydrogen outlet branch pipe 26 in communication with the outer reaction chamber 17, a second hydrogen outlet branch pipe 25 in communication with the inner reaction chamber 18, and a hydrogen output pipe; the pyrolysis gas inlet device 6 is a three-way pipe, comprising a first pyrolysis gas inlet branch pipe 8 in communication with the outer gas distribution chamber 13, a second pyrolysis gas inlet branch pipe 9 in communication with the inner gas distribution chamber 14, and a pyrolysis gas inlet pipe; the water vapor inlet device 7 is a three-way pipe, comprising a first water vapor inlet branch pipe 11 in communication with the outer gas distribution chamber 13, a second water vapor inlet branch pipe 10 in communication with the inner gas distribution chamber 14, and a water vapor inlet pipe; the first pyrolysis gas inlet branch pipe 8, the second pyrolysis gas inlet branch pipe 9, the second water vapor inlet branch pipe 10, the first water vapor inlet branch pipe 11, the first syngas outlet branch pipe 23, the second syngas outlet branch pipe 24, the second hydrogen outlet branch pipe 25, and the first hydrogen outlet branch pipe 26 are all provided with valves; an outer reaction chamber 17 is internally loaded with an outer chamber oxygen carrier, an inner reaction chamber 18 is loaded with an inner chamber oxygen carrier, and the outer chamber oxygen carrier and the inner chamber oxygen carrier can be converted into each other through a reversible chemical reaction. The inner cavity and the outer cavity are made of a stainless-steel material to conduct heat.

The inner chamber oxygen carrier of the inner reaction chamber 18 is disposed on the inner cavity partition plate 16 and the outer chamber oxygen carrier of the outer reaction chamber 17 is disposed on the outer cavity partition plate 15.

As a preferred Example, the outer chamber oxygen carrier is a reduced oxygen carrier, which is oxidized into an oxidized oxygen carrier by the water vapor.

As a preferred Example, the outer chamber oxygen carrier is an oxidized oxygen carrier, which is reduced into a reduced oxygen carrier by the pyrolysis gas.

As a preferred Example, an active ingredient of the oxidized oxygen carrier comprises one of ferroferric oxide ($Fe_3O_4$) and brownmillerite ($Ca_2Fe_2O_5$), preferably the oxidized oxygen carrier is further compounded with an inert component, which is one or more of $Al_2O_3$, $ZrO_2$, and $CeO_2$ the oxidized oxygen carrier has a particle size of 100-300 µm.

As a preferred Example, a cross-sectional area of the inner reaction chamber 18 to that of the outer reaction chamber 17 has a ratio of 1:1.

The outer cavity partition plate 14 is an annular porous partition plate, the inner cavity partition plate 16 is a circular porous partition plate, the annular porous partition plate and the circular porous partition plate have diameters of the pores of 50-100 µm, with a total area of the pores accounting for 50-70% of the surface area.

As a preferred Example, the pyrolysis reactor 3 is successively provided with a feed hopper 1, a feed auger 2, and a pyrolysis carbon collection hopper 4 along the feeding direction of the organic solid waste, and the pyrolysis reactor 3 is in communication with the pyrolysis gas inlet pipe through a pyrolysis gas output channel 5.

As a preferred Example, the pyrolysis reactor 3 has a pyrolysis temperature of 500-700° C., the sleeve-type chemical-looping reactor 19 has a reaction temperature of 800-1000° C., and the inside of the pyrolysis reactor 3, the inner reaction chamber 18, and the outer reaction chamber 17 are provided with heating means.

As a preferred Example, the sleeve-type chemical-looping reactor 19 is provided with a sealing bottom plate 12, the pyrolysis gas inlet device 6 and the water vapor inlet device 7 are fixed by inserting into the sealing bottom plate 12, the outer cavity and the outer cavity are partitioned by a partition plate 20, the inner reaction chamber 18 is provided with a sealing top plate 22, the sealing top plate 22 is provided with an inner reaction chamber feed and discharge channel 27, and the outer reaction chamber 17 is provided with an outer reaction chamber feed and discharge channel 21.

Application Examples

A method for using the organic solid waste treatment device based on chemical-looping hydrogen production according to an Example of the present invention is as follows:

(1) the organic solid waste was placed in a feed hopper 1 and conveyed from a feed auger 2 to the inside, pyrolysis was performed at a pyrolysis temperature to generate a pyrolysis gas and a pyrolysis carbon, the pyrolysis gas 5 entered a pyrolysis gas inlet device 6 through a pyrolysis gas channel, and the pyrolysis carbon was conveyed to a pyrolysis carbon collection hopper 4 for storage;

(2) the outer reaction chamber 17 was loaded with a reduced oxygen carrier, the inner reaction chamber 18 was loaded with an oxidized oxygen carrier, the valves of the second pyrolysis gas inlet branch pipe 9 and the first water vapor inlet branch pipe 11 were opened, the first pyrolysis gas inlet branch pipe 8 and the second water vapor inlet branch pipe 10 were closed, water vapor was introduced into the outer reaction chamber 17, pyrolysis gas was introduced into the inner reaction chamber 18 so that an oxidation reaction occurred in the outer reaction chamber 17 at an operating temperature to generate hydrogen, and a reduction reaction occurred in the inner reaction chamber 18 at an operating temperature to generate syngas;

(3) when the hydrogen has a concentration of less than 1%, the reaction was judged to be completed, and the detection of the hydrogen concentration was performed by an online gas analyzer. After the reaction was completed, the valves of the second syngas outlet branch pipe 24 and the first hydrogen outlet branch pipe 26 were opened, the valves of the first syngas outlet branch pipe 23 and the second hydrogen outlet branch pipe 25 were closed, and hydrogen was output through the hydrogen output device 29, and syngas was output through the syngas output device 28;

(4) the first pyrolysis gas inlet branch pipe 8 and the second water vapor inlet branch pipe 10 were opened, the valves of the second pyrolysis gas inlet branch pipe 9 and the first water vapor inlet branch pipe 11 were closed, pyrolysis gas was introduced into the outer reaction chamber 17, water vapor was introduced into the inner reaction chamber 18 so that a reduction reaction occurred in the outer reaction chamber 17 at an operating temperature to generate syngas, and an oxidation reaction occurred in the inner reaction chamber 18 at an operating temperature to generate hydrogen;

(5) when the hydrogen has a concentration of less than 1%, the reaction was judged to be completed, and the detection of the hydrogen concentration was performed by an online gas analyzer. After the reaction was completed, the valves of the first syngas outlet branch pipe 23 and the second hydrogen outlet branch pipe 25 were opened, the valves of the second syngas outlet branch pipe 24 and the first hydrogen outlet branch pipe 26 were closed, and hydrogen was output through the hydrogen output device 29, and syngas was output through the syngas output device 28;

(6) steps (2) to (5) were repeated to continuously produce syngas and hydrogen.

Another method for using the organic solid waste treatment device based on chemical-looping hydrogen production according to an Example of the present invention is as follows:

(1) the organic solid waste was placed in a feed hopper 1 and conveyed from a feed auger 2 to the inside, pyrolysis was performed at a pyrolysis temperature to generate a pyrolysis gas and a pyrolysis carbon, the pyrolysis gas 5 entered a pyrolysis gas inlet device 6 through a pyrolysis gas channel, and the pyrolysis carbon was conveyed to a pyrolysis carbon collection hopper 4 for storage;

(2) the outer reaction chamber 17 was loaded with an oxidized oxygen carrier, the inner reaction chamber 18 was loaded with a reduced oxygen carrier, the first pyrolysis gas inlet branch pipe 8 and the second water vapor inlet branch pipe 10 were opened, the valves of the second pyrolysis gas inlet branch pipe 9 and the first water vapor inlet branch pipe 11 were closed, pyrolysis gas was introduced into the outer reaction chamber 17, water vapor was introduced into the inner reaction chamber 18 so that a reduction reaction occurred in the outer reaction chamber 17 at an operating temperature to generate syngas, and an oxidation reaction occurred in the inner reaction chamber 18 at an operating temperature to generate hydrogen;

(3) after the reaction was completed the valves of the first syngas outlet branch pipe 23 and the second hydrogen outlet branch pipe 25 were opened, the valves of the second syngas outlet branch pipe 24 and the first hydrogen outlet branch pipe 26 were closed, and hydrogen was output through the hydrogen output device 29, and syngas was output through the syngas output device 28;

(4) the valves of the second pyrolysis gas inlet branch pipe 9 and the first water vapor inlet branch pipe 11 were opened, the first pyrolysis gas inlet branch pipe 8 and the second water vapor inlet branch pipe 10 were closed, water vapor was introduced into the outer reaction chamber 17, pyrolysis gas was introduced into the inner reaction chamber 18 so that an oxidation reaction occurred in the outer reaction chamber 17 at an operating temperature to generate hydrogen, and a reduction reaction occurred in the inner reaction chamber 18 at an operating temperature to generate syngas;

(5) after the reaction was completed, the valves of the second syngas outlet branch pipe 24 and the first hydrogen outlet branch pipe 26 were opened, the valves of the first syngas outlet branch pipe 23 and the second hydrogen outlet branch pipe 25 were closed, and hydrogen was output through the hydrogen output device 29, and syngas was output through the syngas output device 28;

(6) steps (2) to (5) were repeated to continuously produce syngas and hydrogen.

Application Example 1

In this example, the oxygen carrier was $Ca_2Fe_2O_5$ and has a particle size of 100-300 μm.

The pyrolysis temperature of pyrolysis reactor 3 was 600° C., and the reaction temperature of the sleeve-type chemical-looping reactor 19 was 900° C.

Application Example 2

This Example was different from Example 1 in that the oxygen carrier was different. The oxygen carrier was $Fe_3O_4$ with a particle size of 100 μm.

Application Example 3

This Example was different from Example 1 in that the oxygen carrier was different. The oxygen carrier was $Ca_2Fe_2O_5/NiO$ with a particle size of 100 μm.

Application Example 4

This Example was different from Example 2 in that the oxygen carrier was different. The oxygen carrier was $Fe_3O_4/NiO$ with a particle size of 300 μm.

Application Example 5

This Example was different from Example 1 in that the oxygen carrier was different. The oxygen carrier was $Ca_2Fe_2O_5/CeO_2$ with a particle size of 300 μm.

Application Example 6

This Example was different from Example 2 in that the oxygen carrier was different. The oxygen carrier was $Fe_3O_4/ZrO_2$ with a particle size of 300 μm.

Wherein, by using an online gas analyzer to detect the hydrogen concentration of the hydrogen output device 29, the hydrogen concentration was the hydrogen purity. The on-line gas analyzer was used to detect the concentrations of CO and $H_2$ in the syngas output device 28, and the sum of the concentrations of CO and $H_2$ was the purity of syngas. The gas analyzer may acquire one data every 10 seconds. The test results were shown in Table 1.

Table 1 Test results of Examples

TABLE 1

Test results of Examples

| Examples | Oxidized oxygen carrier | Organic solid waste | Hydrogen purity | Syngas purity (sum of CO and $H_2$ concentration) |
|---|---|---|---|---|
| Example 1 | $Ca_2Fe_2O_5$ | Straw powder | 98.12% | 88.33% |
| Example 2 | $Fe_3O_4$ | Straw powder | 92.63% | 84.45% |
| Example 3 | $Ca_2Fe_2O_5/$NiO | Straw powder | 98.65% | 86.12% |
| Example 4 | $Fe_3O_4$/NiO | Straw powder | 98.54% | 80.26% |
| Example 5 | $Ca_2Fe_2O_5/$$CeO_2$ | Straw powder | 99.62% | 85.65% |
| Example 6 | $Fe_3O_4/ZrO_2$ | Straw powder | 96.54% | 82.56% |

In Example 1, only $Ca_2Fe_2O_5$ was used as the oxidized oxygen carrier, a hydrogen purity of 96.12% and a syngas purity of 85.33% were obtained. Compared with Examples 3 and 5, the addition of NiO and $CeO_2$ was beneficial to increasing the purity of syngas, but decreasing the purity of syngas, because the addition of NiO and $CeO_2$ improved the activity of $Ca_2Fe_2O_5$ and facilitated the generation of $CO_2$ and other gases, resulting in a decrease in the purity of syngas, and reduced the carbon deposition during the reaction between the oxidation state oxygen carrier and the pyrolysis gas at the same time, thus increasing the purity of $H_2$. Similarly, the hydrogen purity in Example 2 was lower compared to Examples 4 and 6, but the syngas purity was higher. Compared with Example 1, the purity of syngas in Example 2 was higher than that in Example 1, and the purity of hydrogen in Example 2 was lower than that in Example 1, as it was easy to generate more CO and $H_2$ by $Ca_2Fe_2O_5$ while reacting with pyrolysis gas, with less amount of carbon deposition. Similarly, Examples 3 and 4 and Examples 5 and 6 show the corresponding cases.

Generally, with a $Ca_2Fe_2O_5$ oxygen carrier, hydrogen with a purity higher than 98% and syngas with a purity higher than 85% can be obtained.

As will be readily understood by those skilled in the art, the above are only the preferred examples of the present invention and are not intended to limit the present invention. Any modifications, equivalent substitutions and improvements, and the like made within the spirit and principles of the present invention should fall within the protection scope of the present invention.

What is claimed is:

1. An organic solid waste treatment device based on chemical-looping hydrogen production, comprising a pyrolysis reactor (3) and a sleeve-type chemical-looping reactor (19), wherein the sleeve-type chemical-looping reactor (19) comprises an inner cavity and an outer cavity annularly wrapping the inner cavity, the pyrolysis reactor (3) can generate pyrolysis gas, which then is input to the inner cavity and the outer cavity through the pyrolysis gas inlet device (6), water vapor is input to the inner cavity and the outer cavity through a water vapor inlet device (7), syngas generated in the inner cavity and the outer cavity is output through a syngas output device (28), hydrogen generated in the inner cavity and the outer cavity is output through a hydrogen output device (29), an outer reaction chamber (17) is internally loaded with an outer chamber oxygen carrier, an inner reaction chamber (18) is loaded with an inner chamber oxygen carrier, and the outer chamber oxygen carrier and the inner chamber oxygen carrier can be converted into each other through a reversible chemical reaction;

the outer chamber oxygen carrier is a reduced oxygen carrier, which is oxidized into an oxidized oxygen carrier by the water vapor;

alternatively, the outer chamber oxygen carrier is an oxidized oxygen carrier, which is reduced into a reduced oxygen carrier by the pyrolysis gas;

the inner cavity is horizontally partitioned by an inner cavity partition plate (16) to form an inner gas distribution chamber (14) and an inner reaction chamber (18), and the outer cavity is horizontally partitioned by an outer cavity partition plate (15) to form an outer gas distribution chamber (13) and an outer reaction chamber (17);

the syngas output device (28) is a three-way pipe, comprising a first syngas outlet branch pipe (23) in communication with the outer reaction chamber (17), a second syngas outlet branch pipe (24) in communication with the inner reaction chamber (18), and a syngas output pipe;

the hydrogen output device (29) is a three-way pipe, comprising a first hydrogen outlet branch pipe (26) in communication with the outer reaction chamber (17), a second hydrogen outlet branch pipe (25) in communication with the inner reaction chamber (18), and a hydrogen output pipe;

the pyrolysis gas inlet device (6) is a three-way pipe, comprising a first pyrolysis gas inlet branch pipe (8) in communication with the outer gas distribution chamber (13), a second pyrolysis gas inlet branch pipe (9) in communication with the inner gas distribution chamber (14), and a pyrolysis gas inlet pipe;

the water vapor inlet device (7) is a three-way pipe, comprising a first water vapor inlet branch pipe (11) in communication with the outer gas distribution chamber (13), a second water vapor inlet branch pipe (10) in communication with the inner gas distribution chamber (14), and a water vapor inlet pipe;

the first pyrolysis gas inlet branch pipe (8), the second pyrolysis gas inlet branch pipe (9), the second water vapor inlet branch pipe (10), the first water vapor inlet branch pipe (11), the first syngas outlet branch pipe (23), the second syngas outlet branch pipe (24), the second hydrogen outlet branch pipe (25), and the first hydrogen outlet branch pipe (26) are all provided with valves.

2. The organic solid waste treatment device according to claim 1, wherein an active ingredient of the oxidized oxygen carrier comprises one of ferroferric oxide ($Fe_3O_4$) and brownmillerite ($Ca_2Fe_2O_5$), preferably the oxidized oxygen carrier is further compounded with an inert component, which is one or more of $Al_2O_3$, $ZrO_2$, and $CeO_2$, and the oxidized oxygen carrier has a particle size of 100-300 μm.

3. The organic solid waste treatment device according to claim 2, wherein a cross-sectional area of the inner reaction chamber (18) to that of the outer reaction chamber (17) has a ratio of 1:1, the outer cavity partition plate (14) is an annular porous partition plate, the inner cavity partition plate (16) is a circular porous partition plate, the annular porous partition plate and the circular porous partition plate have diameters of the pores of 50-100 μm, with a total area of the pores accounting for 50-70% of the surface area.

4. The organic solid waste treatment device according to claim 1, wherein the pyrolysis reactor (3) is successively provided with a feed hopper (1), a feed auger (2), and a pyrolysis carbon collection hopper (4) along the feeding direction of the organic solid waste, and the pyrolysis reactor (3) is in communication with the pyrolysis gas inlet pipe through a pyrolysis gas output channel (5).

5. The organic solid waste treatment device according to claim 4, wherein the pyrolysis reactor (3) has a pyrolysis temperature of 500-700° C., the sleeve-type chemical-looping reactor (19) has a reaction temperature of 800-1000° C., and the inside of the pyrolysis reactor (3), the inner reaction chamber (18), and the outer reaction chamber (17) are provided with heating means.

6. The organic solid waste treatment device according to claim 1, wherein the sleeve-type chemical-looping reactor (19) is provided with a sealing bottom plate (12), the pyrolysis gas inlet device (6) and the water vapor inlet device (7) are fixed by inserting into the sealing bottom plate (12), the outer cavity and the outer cavity are partitioned by a partition plate (20), the inner reaction chamber (18) is provided with a sealing top plate (22), the sealing top plate (22) is provided with an inner reaction chamber feed and discharge channel (27), and the outer reaction chamber (17) is provided with an outer reaction chamber feed and discharge channel (21).

7. A method of using the organic solid waste treatment device according to claim 1, comprising the following steps:
  (1) placing the organic solid waste in a feed hopper, conveying the organic solid waste from a feed auger to the inside, performing pyrolysis at a pyrolysis temperature to generate a pyrolysis gas and a pyrolysis carbon, the pyrolysis gas entering a pyrolysis gas inlet device through a pyrolysis gas channel, and conveying the pyrolysis carbon to a pyrolysis carbon collection hopper for storage;
  (2) loading the outer reaction chamber with a reduced oxygen carrier, loading the inner reaction chamber with an oxidized oxygen carrier, opening the valves of the second pyrolysis gas inlet branch pipe and the first water vapor inlet branch pipe, closing the first pyrolysis gas inlet branch pipe and the second water vapor inlet branch pipe, introducing water vapor into the outer reaction chamber, introducing pyrolysis gas into the inner reaction chamber so that an oxidation reaction occurs in the outer reaction chamber at an operating temperature to generate hydrogen, and a reduction reaction occurs in the inner reaction chamber at an operating temperature to generate syngas;
  (3) after the reaction is completed, opening the valves of the second syngas outlet branch pipe and the first hydrogen outlet branch pipe, closing the valves of the first syngas outlet branch pipe and the second hydrogen outlet branch pipe, outputting hydrogen through the hydrogen output device, and outputting syngas through the syngas output device;
  (4) opening the first pyrolysis gas inlet branch pipe and the second water vapor inlet branch pipe, closing the valves of the second pyrolysis gas inlet branch pipe and the first water vapor inlet branch pipe, introducing pyrolysis gas into the outer reaction chamber, introducing water vapor into the inner reaction chamber so that a reduction reaction occurs in the outer reaction chamber at an operating temperature to generate syngas, and an oxidation reaction occurs in the inner reaction chamber at an operating temperature to generate hydrogen;
  (5) after the reaction is completed, opening the valves of the first syngas outlet branch pipe and the second hydrogen outlet branch pipe, closing the valves of the second syngas outlet branch pipe and the first hydrogen outlet branch pipe, outputting hydrogen through the hydrogen output device, and outputting syngas through the syngas output device;
  (6) repeating steps (2) to (5) to continuously produce syngas and hydrogen.

8. A method of using the organic solid waste treatment device according to claim 1, comprising the following steps:
  (1) placing the organic solid waste in a feed hopper, conveying the organic solid waste from a feed auger to the inside, performing pyrolysis at a pyrolysis temperature to generate a pyrolysis gas and a pyrolysis carbon, the pyrolysis gas entering a pyrolysis gas inlet device through a pyrolysis gas channel, and conveying the pyrolysis carbon to a pyrolysis carbon collection hopper for storage;
  (2) loading the outer reaction chamber with an oxidized oxygen carrier, loading the inner reaction chamber with a reduced oxygen carrier, opening the first pyrolysis gas inlet branch pipe and the second water vapor inlet branch pipe, closing the valves of the second pyrolysis gas inlet branch pipe and the first water vapor inlet branch pipe, introducing pyrolysis gas into the outer reaction chamber, introducing water vapor into the inner reaction chamber so that a reduction reaction occurs in the outer reaction chamber at an operating temperature to generate syngas, and an oxidation reaction occurs in the inner reaction chamber at an operating temperature to generate hydrogen;
  (3) after the reaction is completed, opening the valves of the first syngas outlet branch pipe and the second hydrogen outlet branch pipe, closing the valves of the second syngas outlet branch pipe and the first hydrogen outlet branch pipe, outputting hydrogen through the hydrogen output device, and outputting syngas through the syngas output device;
  (4) opening the valves of the second pyrolysis gas inlet branch pipe and the first water vapor inlet branch pipe, closing the first pyrolysis gas inlet branch pipe and the second water vapor inlet branch pipe, introducing water vapor into the outer reaction chamber, introducing pyrolysis gas into the inner reaction chamber so that an oxidation reaction occurs in the outer reaction chamber at an operating temperature to generate hydrogen, and a reduction reaction occurs in the inner reaction chamber at an operating temperature to generate syngas;
  (5) after the reaction is completed, opening the valves of the second syngas outlet branch pipe and the first hydrogen outlet branch pipe, closing the valves of the first syngas outlet branch pipe and the second hydrogen outlet branch pipe, outputting hydrogen through the hydrogen output device, and outputting syngas through the syngas output device;

(6) repeating steps (2) to (5) to continuously produce syngas and hydrogen.

\* \* \* \* \*